(12) United States Patent
Oh et al.

(10) Patent No.: US 7,660,607 B2
(45) Date of Patent: Feb. 9, 2010

(54) METHOD FOR SUPPORTING VARIOUS MULTI-ANTENNA SCHEMES IN BWA SYSTEM USING MULTIPLE ANTENNAS

(75) Inventors: Jeong-Tae Oh, Yongin-si (KR); Won-Il Roh, Yongin-si (KR); Kyun-Byoung Ko, Hwaseong-si (KR); Jae-Ho Jeon, Seongnam-si (KR); Sung-Ryul Yun, Suwon-si (KR); Hong-Sil Jeong, Suwon-si (KR); Chan-Byoung Chae, Seoul (KR); Seung-Joo Maeng, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 438 days.

(21) Appl. No.: 11/268,893

(22) Filed: Nov. 8, 2005

(65) Prior Publication Data

US 2006/0098568 A1 May 11, 2006

(30) Foreign Application Priority Data

Nov. 9, 2004 (KR) .................. 10-2004-0091120

(51) Int. Cl.
H04M 1/00 (2006.01)
H04B 1/00 (2006.01)
H04B 7/00 (2006.01)
H04J 11/00 (2006.01)

(52) U.S. Cl. .................. 455/562.1; 455/69; 370/208
(58) Field of Classification Search ............ 455/562.1, 455/69; 370/208
See application file for complete search history.

(56) References Cited

U.S. PATENT DOCUMENTS 7,103,325 B1* 9/2006 Jia et al. ............... 455/101
7,120,199 B2* 10/2006 Thielecke et al. ......... 375/267
7,120,395 B2* 10/2006 Tong et al. ............. 455/101

(Continued)

FOREIGN PATENT DOCUMENTS

JP 2003-018127 1/2003

(Continued)

OTHER PUBLICATIONS

IEEE Standards (IEEE std 802.16-2004, from: http://wirelessman.org/pubs/802.16-2004.html), "Air interface for fixed broadband wireless access systems", IEEE, Oct. 1, 2004, pp. 347-372.*

(Continued)

*Primary Examiner*—Rafael Pérez-Gutiérrez
*Assistant Examiner*—Allahyar Kasraian
(74) *Attorney, Agent, or Firm*—The Farrell Law Firm, LLP

(57) ABSTRACT

Disclosed is a method for using various multiple antenna schemes in a baseband wireless access system is provided. According to the method, a downlink MAP message is constructed in order to support various multiple antenna schemes based on a multiple-input multiple output (MIMO), which is one of the multiple antenna schemes, so that compatibility with exiting MIMO technology having no MIMO feedback can be achieved and overhead occurring in transmission of an MAP information element can be reduced. Further, it is possible to efficiently support spatial multiplexing technology capable of transmitting multiple layers having different modulation and coding in a MIMO system.

14 Claims, 3 Drawing Sheets

U.S. PATENT DOCUMENTS

| | | | |
|---|---|---|---|
| 7,197,084 B2 * | 3/2007 | Ketchum et al. | 375/296 |
| 7,315,577 B2 * | 1/2008 | Shao | 375/260 |
| RE40,056 E * | 2/2008 | Heath et al. | 375/267 |
| 7,397,804 B2 * | 7/2008 | Dulin et al. | 370/395.4 |
| 7,430,243 B2 * | 9/2008 | Giannakis et al. | 375/267 |
| 7,440,510 B2 * | 10/2008 | Sandhu et al. | 375/267 |
| 7,486,739 B2 * | 2/2009 | Hottinen et al. | 375/267 |
| 7,505,529 B2 * | 3/2009 | Kwak et al. | 375/295 |
| 7,567,621 B2 * | 7/2009 | Sampath et al. | 375/267 |
| 7,573,806 B2 * | 8/2009 | Ihm et al. | 370/208 |
| 7,587,172 B2 * | 9/2009 | Kim et al. | 455/63.1 |
| 2004/0057530 A1 * | 3/2004 | Tarokh et al. | 375/267 |
| 2005/0041622 A1 * | 2/2005 | Dubuc et al. | 370/332 |
| 2005/0128966 A1 * | 6/2005 | Yee | 370/310 |
| 2005/0135284 A1 * | 6/2005 | Nanda et al. | 370/294 |
| 2005/0135295 A1 * | 6/2005 | Walton et al. | 370/328 |
| 2005/0135318 A1 * | 6/2005 | Walton et al. | 370/338 |
| 2005/0180315 A1 * | 8/2005 | Chitrapu et al. | 370/208 |
| 2005/0259629 A1 * | 11/2005 | Oliver et al. | 370/345 |
| 2006/0013328 A1 * | 1/2006 | Zhang et al. | 375/267 |
| 2006/0035643 A1 * | 2/2006 | Vook et al. | 455/450 |
| 2006/0093057 A1 * | 5/2006 | Zhang et al. | 375/267 |
| 2006/0109923 A1 * | 5/2006 | Cai et al. | 375/260 |
| 2008/0039107 A1 * | 2/2008 | Ma et al. | 455/450 |
| 2008/0069031 A1 * | 3/2008 | Zhang et al. | 370/328 |
| 2008/0187136 A1 * | 8/2008 | Zhang et al. | 380/270 |

FOREIGN PATENT DOCUMENTS

| | | |
|---|---|---|
| KR | 1020040039849 | 5/2004 |
| KR | 1020040083787 | 10/2004 |
| WO | WO 01/78254 A1 * | 10/2001 |
| WO | WO 03/084092 | 10/2003 |
| WO | WO 03/085875 | 10/2003 |
| WO | WO 2004/039011 | 5/2004 |

OTHER PUBLICATIONS

Roh et al., "H-ARQ MAC Support for MIMO OFDMA", Last Modified Sep. 23, 2004, IEEE 802.16 Broadband Wireless Access Working Group, All Pages.*

Zhuang et al, "Per Stream Power Control in CQICH Enhanced Allocation IE", Last Modified Apr. 13, 2005, IEEE 802.16 Broadband Wireless Access Working Group, All Pages.*

Roh et al., "Framework for Enabling Closed-loop MIMO for OFDMA", Last Modified Nov. 23, 2004, IEEE 802.16 Broadband Wireless Access Working Group, All Pages.*

Erik Lindskog et al., "Space-Time Codes for 3 Transmit antennas for the OFDMA PHY", IEEE 802.16 Broadband Working Group, Jul. 14,2004 Wireless.

* cited by examiner

| Layer=1 (TD or VE only) | | | | Ml=1 | L=2 (HE only) | | | L=3 (HE only) | | | | L=4 (HE only) | | | |
|---|---|---|---|---|---|---|---|---|---|---|---|---|---|---|---|
| Ml=1 | 2 | 3 | 4 | | 2 | 3 | 4 | 1 | 2 | 3 | 4 | 1 | 2 | 3 | 4 |
| | A (TD) | A (TD) | A (TD) | | | | | | | | | | | | |
| | | B (VE) | B (VE) | | | B (HE) | B (HE) | | | | | | | | |
| | C (VE) | C (VE) | C (VE) | | C (HE) | | | | | C (HE) | | | | | C (HE) |

FIG.3

METHOD FOR SUPPORTING VARIOUS MULTI-ANTENNA SCHEMES IN BWA SYSTEM USING MULTIPLE ANTENNAS

PRIORITY

This application claims priority to an application entitled "Method for Supporting Various Multi-antenna Schemes in BWA System Using Multiple Antenna" filed in the Korean Intellectual Property Office on Nov. 9, 2004 and assigned Serial No. 2004-91120, the contents of which are incorporated herein by reference.

BACKGROUND OF THE INVENTION

1. Field of the Invention

The present invention relates to a Broadband Wireless Access (BWA) system, and more particularly to a method for supporting various multiple antenna schemes in a system using an Orthogonal Frequency Division Multiple Access (OFDMA) scheme.

2. Description of the Related Art

In the current wireless mobile communication system, extensive research is being conducted into a high quality multimedia service capable of transmitting mass storage data at a high speed. Different from wire channel environments, wireless channel environments are subject to a distortion of the actual transmission signals due to various factors such as multi-path interference, shadowing, wave attenuation, time-varying noise and interference. Fading due to the multi-path interference is closely related to the mobility of a reflector or a user terminal. Accordingly, the actual transmission signals are mixed with interference signals and mixed signals are received. Because the received signals already represent a serious distortion of the actual transmission signals, the entire performance of a mobile communication system may deteriorate.

Fading may also distort the amplitude and phase of the received signals, and may become a main factor that disrupts the high speed data communication in wireless channel environments. Therefore, extensive research is being conducted in order to solve the fading problem. In order to transmit data at a high speed in a mobile communication system, it is necessary to minimize loss and any user-by-user interference resulting from the characteristics of a mobile communication channel. One of the technologies proposed in order to solve the afore-described problems is a Multiple Input Multiple Output (MIMO) technology.

The MIMO technology may be classified according to the data transmission schemes used and whether the channel information is fedback.

First, the MIMO technology may be classified into a Spatial Multiplexing (SM) technique and a Spatial Diversity (SD) technique according to the data transmission schemes. The SM technique is a technique for simultaneously transmitting different data by means of multiple antennas in a transmitter and a receiver, thereby transmitting data at a higher speed without increasing the bandwidth of the system. The SD technique is a technique for transmitting the identical data through multiple transmit (Tx) antennas, thereby achieving the Transmit Diversity (TD).

The MIMO technology may also be classified into a closed-loop scheme, in which channel information is fedback from a receiver to a transmitter, and an open loop scheme, in which channel information is not fedback from a receiver to a transmitter.

Referring to the current standard documents 802.16-REVd&D5, REVe/D5-2004 of the Institute of Electrical and Electronics Engineers (IEEE) 802.16e standard, only a scheme for supporting the MIMO technology using the open loop scheme has been proposed.

SUMMARY OF THE INVENTION

Accordingly, the present invention has been made to solve at least the above-mentioned problems occurring in the prior art, and it is an object of the present invention to provide a method for supporting various multiple antenna schemes based on MIMO technology in a BWA system using multiple antennas.

It is another object of the present invention to provide a method for supporting various multiple antenna schemes by constructing an MAP message for classifying MIMO technology in a BWA system using multiple antennas.

It is a further object of the present invention to provide a method for supporting various multiple antenna schemes by constructing a downlink MAP message for efficiently providing multiple antenna technology, precoding or antenna grouping technology, antenna selection technology, etc., which have feedback from a mobile station.

In order to accomplish the aforementioned objects, according to one aspect of the present, there is provided a method for supporting various Multiple Input Multiple Output (MIMO) and precoding technologies in a Broadband Wireless Access (BWA) system employing an antenna technique of a MIMO scheme, the method including configuring a downlink MAP message that includes basic information fields for indicating the MIMO technology and information fields for indicating various precoding technologies; and applying the MIMO technology to a mobile station by means of the downlink MAP message.

BRIEF DESCRIPTION OF THE DRAWINGS

The above and other objects, features and advantages of the present invention will be more apparent from the following detailed description taken in conjunction with the accompanying drawings, in which:

FIG. 3 is a diagram illustrating available technology according to the number of layers and streams according to an embodiment of the present invention.

DETAILED DESCRIPTION OF THE PREFERRED EMBODIMENT

Hereinafter, preferred embodiments according to the present invention will be described with reference to the accompanying drawings. In the below description, many particular items, such as detailed elements, are shown, but these are provided for helping the general understanding of the present invention, and it is apparent to those skilled in the art that the particular items can be modified or varied within the scope of the present invention.

The present invention provides a method for using various Multiple Input Multiple Output (MIMO) schemes in a Broadband Wireless Access (BWA) communication system using multiple antennas. Particularly, the present invention proposes a new downlink (DL)-MAP message in order to use a closed-loop MIMO scheme in a BWA communication system. The new DL-MAP message provides a method for selecting a transmission matrix corresponding to both the number of layers determined by the number of modulators and the number Mt of streams output from a Space Time Coding (STC) encoder. The STC encoder can be realized by a serial-to-parallel (S/P) converter. The transmission matrix has already been defined the IEEE 802.16 standard according to a transmit diversity scheme, a vertical encoding scheme and a horizontal encoding scheme.

When MIMO technology using the new DL-MAP message is applied to a BWA communication system, it is possible to make the closed-loop MIMO technology using the Channel Quality Information (CQI) fedback from a mobile station, i.e., a receiver, compatible with an exiting open loop MIMO technology having no feedback of the CQI. When the closed-loop MIMO technology is used, it is possible to perform a precoding.

Figure 1:
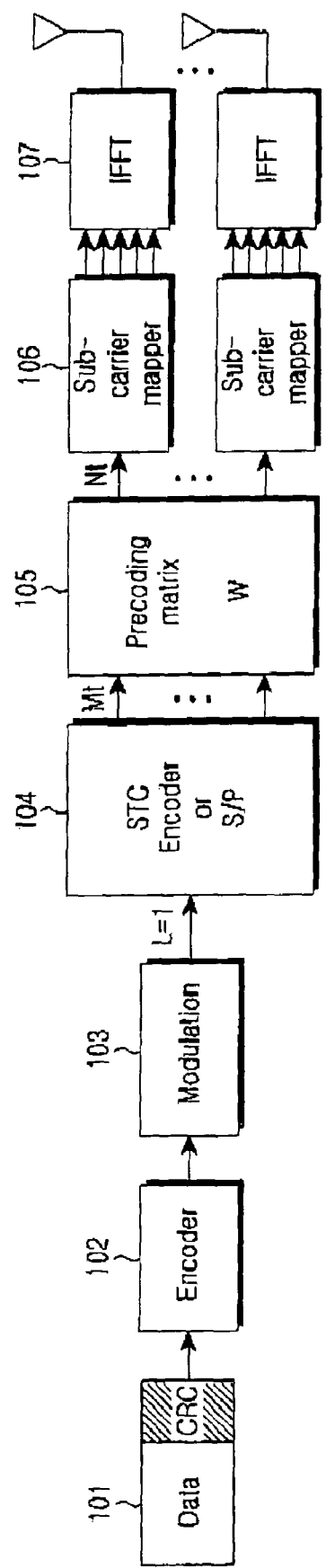
FIG. 1 is a block diagram illustrating the construction of a transmitter, which includes a single encoder and a single modulator, capable of performing precoding by means of feedback information received from a mobile station in a BWA system according to an embodiment of the present invention.

FIG. 1 is a block diagram illustrating the construction of a transmitter, which includes a single encoder and a single modulator, capable of performing precoding by means of feedback information received from a mobile station in a BWA system according to an embodiment of the present invention.

Referring to FIG. 1, the transmitter includes an encoder 102 for performing coding for data 101 to be transmitted, a modulator 103 for mapping the coded data on a complex plane, an STC encoder 104 for applying basic MIMO technology to the modulated data, and a precoding block 105 for performing precoding for Mt number of streams received from the STC encoder 104. The precoding block 105 applies MIMO technology by using the CQI fedback from a mobile station. Further, the transmitter includes a sub-carrier mapper 106 for mapping a symbol received from the precoding block 105, and an Inverse Fast Fourier Transform (IFFT) unit 107 for transforming the mapped symbol into an Orthogonal Frequency Division Multiple Access (OFDMA) symbol.

Because the transmitter includes one coder 102 and one modulator 103 as described above, the number of layers becomes one (L=1) and the STC encoder 104 outputs the Mt number of streams. Herein, MIMO technology for causing the Mt number of streams to acquire a diversity gain for common transmission signals corresponds to transmit diversity technology. Further, MIMO technology for causing the Mt number of streams to acquire a gain for two or more separate transmission signals in view of a data rate will be referred to as Vertical Encoding (VE) Spatial Multiplexing (SM) technology.

The preceding block 105 receives the Mt number of streams and performs an Mt×Nt matrix operation. The Nt represents the number of transmit antennas.

The transmitter having the construction as described above receives channel feedback information and generates a matrix value of the precoding block 105, thereby operating by applying various MIMO algorithms such as feedback precoding (e.g., SVD precoding, beamforming preceding, etc), antenna grouping precoding, and antenna selection preceding.

The STC encoder 104 receives one input sequence so as to generate the Mt number of streams. When beamforming-precoding technology is applied, the STC encoder 104 can output the Mt number of streams without performing STC encoding.

Figure 2:
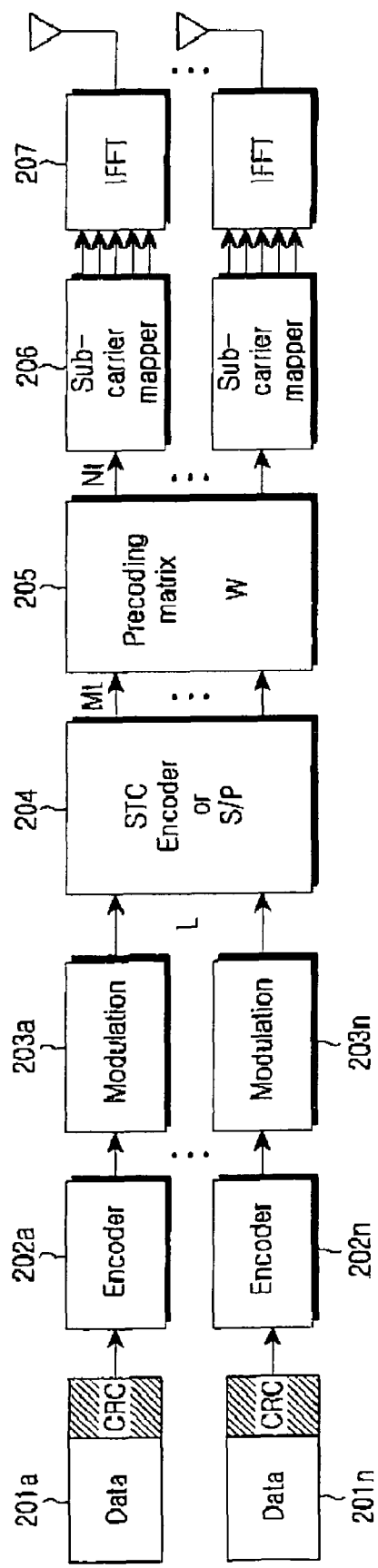
FIG. 2 is a block diagram illustrating the construction of a transmitter, which includes a plurality of encoders and modulators, capable of performing precoding by means of feedback information received from a mobile station in a BWA system according to another embodiment of the present invention.

FIG. 2 is a block diagram illustrating the construction of a transmitter, which includes a plurality of encoders and modulators, capable of performing precoding by means of feedback information received from a mobile station in a BWA system according to another embodiment of the present invention.

Referring to FIG. 2, the transmitter includes a plurality of encoders 202a to 202n and modulators 203a to 203n. Because the functions of the encoder and the modulator have already been described with reference to FIG. 1, further detailed description will be omitted.

Herein, MIMO transmission technology applied to the transmitter having a plurality of layers will be referred to as a Horizontal Encoding (HE) spatial multiplexing technology.

The STC encoder 204 receives L number of input sequences so as to generate Mt number of streams. When beamforming-precoding technology is applied, the STC encoder 204 can output the Mt number of streams without performing STC encoding.

FIG. 3 is a diagram illustrating a scheme for applying a transmission matrix according to the number of layers and streams in a BWA communication system according to an embodiment of the present invention.

Referring to FIG. 3, A, B and C represent transmission matrices. Each of the STC encoders 104 and 204 selects one transmission matrix according to the number of layers and streams in FIG. 3, thereby performing STC encoding. In the transmission matrix, a row index coincides with the number of antennas and a column index coincides with an OFDMA symbol time.

Equations 1 and 2 below represent sequential input symbol matrices of the STC encoders 104 and 204 of transmit diversity and spatial multiplexing when the Mt is 2.

$$A_{(Mt=2)} = \begin{bmatrix} S_1 & -S_2^* \\ S_2 & S_1^* \end{bmatrix} \qquad (1)$$

$$C_{(Mt=2)} = \begin{bmatrix} S_1 \\ S_2 \end{bmatrix} \qquad (2)$$

Equations 3 to 5 below represent sequential input symbol matrices of the STC encoders 104 and 204 of the transmit diversity, a hybrid of the transmit diversity and the spatial multiplexing, and the spatial multiplexing when the Mt is 3.

$$A_{(Mt=3)} = \begin{bmatrix} \tilde{S}_1 & -\tilde{S}_2^* & 0 & 0 \\ \tilde{S}_2 & \tilde{S}_1^* & \tilde{S}_3 & -\tilde{S}_4^* \\ 0 & 0 & \tilde{S}_4 & \tilde{S}_3^* \end{bmatrix} \qquad (3)$$

$$B_{(Mt=3)} = \begin{bmatrix} \tilde{S}_1 & -\tilde{S}_2^* & \tilde{S}_5 & -\tilde{S}_6^* \\ \tilde{S}_7 & -\tilde{S}_8^* & \tilde{S}_3 & -\tilde{S}_4^* \\ \tilde{S}_2 & \tilde{S}_1^* & \tilde{S}_6 & \tilde{S}_5^* \end{bmatrix} \qquad (4)$$

$$C_{(Mt=3)} = \begin{bmatrix} S_1 \\ S_2 \\ S_3 \end{bmatrix} \qquad (5)$$

Equations 6 to 8 below represent sequential input symbol matrices of the STC encoders 104 and 204 of the transmit diversity, a hybrid of the transmit diversity and the spatial multiplexing, and spatial multiplexing when the Mt is 4.

$$A_{(Mt=4)} = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix} \quad (6)$$

$$B_{(Mt=4)} = \begin{bmatrix} S_1 & -S_2^* & S_5 & -S_7^* \\ S_2 & S_1^* & S_6 & -S_8^* \\ S_3 & -S_4^* & S_7 & -S_5^* \\ S_4 & S_3^* & S_8 & S_6^* \end{bmatrix} \quad (7)$$

$$C_{(Mt=4)} = \begin{bmatrix} S_1 \\ S_2 \\ S_3 \\ S_4 \end{bmatrix} \quad (8)$$

Tables 1 to 3 below represent data formats of a MIMO_Compact_DL-MAP message proposed as one example in order to efficiently provide all MIMO-based technologies in a BWA system according to an embodiment of the present invention.

TABLE 1

| Syntax | Size (bits) | Notes |
|---|---|---|
| MIMO_Compact_DL-MAP_IE ( ) { | | |
| Compact_DL-MAP Type | 3 | Type = 7 |
| DL-MAP Sub-type | 5 | MIMO = 0x01 |
| Length | 4 | Length of the IE in Byte |
| MIMO_Type | 2 | Type of MIMO Mode |
| | | 00 = Open-loop |
| | | 01 = Antenna Grouping |
| | | 10 = antenna Selecting |
| | | 11 = Closed-loop Precoding |
| Num_layer | 2 | Number of Multiple coding/modulation layers |
| | | 00 = 1 layer |
| | | 01 = 2 layers |
| | | 10 = 3 layers |
| | | 11 = 4 layers |
| Mt | 2 | Indicate number of STC output streams |
| | | 00 = 1 stream |
| | | 01 = 2 streams |
| | | 10 = 3 streams |
| | | 11 = 4 streams |

Table 2 below represents a message field subsequent to Table 1.

TABLE 2

| | | |
|---|---|---|
| Mode_Change if (Mode_Change == 1){ | 1 | Indicates Change of MIMO mode 0 = No change from previous allocation 1 = Change of MIMO mode |
| if (MIMO_Type == 00 or 11){ if (MIMO_Type == 11){ Precoding Index} | 6 | Indicates the index of precoding Matrix Sec8.4.8.3.6 |
| Matrix Indicator } if (MIMO_Type == 01){ | 2 | Indicates open-loop matrix (Sec 8.4.8.3) 00 = Matrix A(Transmit Diversity) 01 = Matrix B (Hybrid scheme Allocation only for 3 and 4 antennas) |

TABLE 2-continued

| | | |
|---|---|---|
| | | 10 = Matrix C(Pure Spatial Multiplexing) 11 = Reserved |
| Antenna Grouping Index } | 4 | Indicates the index of antenna grouping Sec 8.4.8.3.4 and 8.4.8.3.5 |
| If (MIMO_Type == 10){ Antenna Selection Index} | 4 | Indicates the index of antenna selection Sec 8.4.8.3.4 and 8.4.8.3.5 |
| } for (j=1;j<Num_layer; j++){ | | This loop specifies the Nep for layers 2 and above when required for STC. The same Nsch and RCID applied for each layer |
| If (H-ARQ Mode=CTC Incremental Redundancy) { Nep} elseif(H-ARQ Mode=Generic Chase)} DIUC } | 4 | H-ARQ Mode is specified in the H-ARQ Compact_DL-MAP IE format for Switch H-ARQ Mode |
| if(CQICH indicator == 1){ | | CQICH indicator comes from the precoding Compact DL-MAP IE |
| Allocation Index } | 6 | Index to CQICH assigned to this layer, For the multi-layer MIMO transmission, the feedback type for this CQICH and that of the precoding Compact DL-MAP IE shall be 000. |
| } | | |

Table 3 below represents a message field subsequent to Table 2.

TABLE 3

| | | |
|---|---|---|
| CQICH_Num | 2 | Total number of CQICHs assigned to this SS is (CQICH_Num + 1) 00 = 1 CQICH 01 = 2 CQICH 10 = 3 CQICH 11 = 4 CQICH |
| for (j=1;j<CQICH_NUM;j++){ CQI Feedback type | 3 | Type of contents on CQICH for this SS 000 = Fast D1, measurement/Default Feedback 001 = Precoding Weight Matrix Information 010 = Channel Matrix H 011 = Adaptive Rate Control Information 100 = Antenna Selection Index 101–111 = Reserved |
| Period(p) | 2 | Period of the additional (CQICH_Num) CQI channels in frame |
| for (i=0;i<CQICH_Num;i++){ Allocation index | 5 | Index to uniquely identify the additional CQICH resources assigned to the SS |
| } } padding } | variable | The padding bits are used to ensure the IE size is integer number of bytes |

In Table 1, the initial 8 bits of an MAP information element for providing MIMO-based control information represent a type of a MAP information element of 3 bits and a sub-type of 5 bits, and a length field of 4 bits represents length of the MIMO-based control information, which is located in the next field.

The construction of the control information will be described. The field 'MIMO type' of 2 bits represents a MIMO mode. That is, when the field 'MIMO type' has a value of '00', it indicates an open loop MIMO mode. When the field 'MIMO type' has a value of '01', it indicates an antenna grouping MIMO mode. When the field 'MIMO type' has a value of '10', it indicates an antenna selection MIMO mode. When the field 'MIMO type' has a value of '11', it indicates a MIMO mode in which closed-loop precoding is performed.

The field 'Num-layer' is a field for indicating the number of layers, which is the number of signal branches input to the STC encoder.

The field 'Mt' is a field for indicating the number of streams output from the STC encoder. The transmitter determines the transmission matrices expressed by A, B and C in FIG. 3 by using the values of the field 'Num-layer' and the field 'Mt'. For example, when the field 'Num-layer' has a value of '10' and the field 'Mt' has a value of '10', the STC encoder performs STC encoding by using the horizontal encoding transmission matrix C.

The field 'Mode_Change' is a field for indicating if the MIMO mode has changed. For example, when the 'Mode_Change' has a value of '1', it means the use of a MIMO mode different from the previous MIMO mode. However, when the 'Mode_Change' has a value of '0', it means the current MIMO mode is identical to the previous MIMO mode. In this case, there is no changed information, it is not necessary to include the previous MIMO type information. Accordingly, it is possible to reduce the size of the Compact_DL-MAP message.

When the field 'MIMO type' in Table 1 is designated to '00' or '11', it indicates a matrix index used in an open loop or a preceding matrix index used in a closed-loop.

Table 4 below or FIG. 3 represents combinations available according to the number L of layers and the number Mt of streams. Further, when the 'MIMO type' has a value of '11', to which feedback precoding technology is designated, from among the closed-loop MIMO types, it indicates a corresponding feedback precoding matrix through an index of 6 bits for feedback precoding while the STC encoder is used. Herein, the feedback preceding matrix may have a size of Mt (the number of streams)×Nt (the number of transmit antennas) and 64 different matrices at maximum, and the feedback precoding matrix may have a value depending on a generation algorithm, the number of layers, the number of streams, and the number of transmit antennas.

TABLE 4

| Matrix Indicator | if (Num_layer = 1){ |
|---|---|
| This field indicates MIMO matrix for the burst. | if (Mt = 1){<br>  SISO or AAS mode }<br>elseif (Mt = 2){<br>  00 = A(TD);01 = C(VE);10 11 = Reserved}<br>elseif (Mt = 3){<br>  00 = A(TD);01 = B(VE);10 = C(VE) 11 = Reserved}<br>elseif (Mt = 4){<br>  00 = A(TD);01 = B(VE);10 = C(VE) 11 = Reserved}<br>}<br>else if (Num_layer = 2){<br>if (Mt = 2){<br>  00 = C(HE);01 11 = Reserved}<br>elseif (Mt = 3){<br>  00 = B(HE);01 11 = Reserved} |

TABLE 4-continued

| | elseif (Mt = 4){<br>  00 = B(HE);01 11 = Reserved}<br>}<br>elseif (Num_layer = 3){<br>if (Mt = 3){<br>  00 = C(HE);01 11 = Reserved}<br>}<br>elseif (Num_layer = 4){<br>if (Mt = 4){<br>  00 = C(HE);01 11 = Reserved}<br>} |
|---|---|

When the 'MIMO type' in Table 1 has a value of '01' and antenna grouping technology is designated, it may indicate an antenna precoding matrix through an antenna grouping index of 4 bits in Table 2.

Table 5 below represents matrix combinations that may be indicated by the antenna grouping index of 4 bits in Table 2. Herein, the MIMO technologies in FIG. 3 to be first applied are determined by the number of layers and the number Mt of streams in Table 1, and the MIMO technology to be finally applied is determined by the field 'antenna grouping index of 4 bits' as expressed by Table 5 below.

As described above, STC encoding technology to be applied of the STC encoders 104 and 204 can be determined by the single field 'antenna grouping index of 4 bits', and matrix values of the precoding blocks 105 and 205 can be similarly understood. Accordingly, it is possible to efficiently reduce overhead of the control information message.

TABLE 5

| Antenna Grouping Index<br>This field indicates antenna Grouping Index for the current burst. |
|---|
| if (Num_layer = 1){<br>  if (Mt = 3){<br>    0000 = A1;0001 = A2; 0010 = A3;<br>    0011 = B1(VE); 0100 = B2(VE); 0101 = B3(VE);<br>    0110–1111 = Reserved}<br>  elseif (Mt = 4){<br>    0000 = A1;0001 = A2; 0010 = A3;<br>    0011 = B1(VE); 0100 = B2(VE); 0101 = B3(VE); 0110 = B4(VE);<br>    0111 = B5(VE); 1000 = B6(VE);<br>    1001–1111 = Reserved}<br>}<br>elseif (Num_layer = 2){<br>  if (Mt = 3){<br>    0000 = B1(HE); 0001 = B2(HE); 0010 = B3(HE);<br>    0011–1111 = Reserved}<br>  elseif (Mt = 4){<br>    0000 = B1(HE); 0001 = B2(HE); 0010 = B3(HE); 0011 = B4(HE);<br>    0100 = B5(HE); 0101 = B6(HE);<br>    0110–1111 = Reserved} |

When the 'MIMO type' in Table 1 has a value of '10' and antenna selection technology is designated, it may indicate a precoding matrix through the field 'antenna selection index of 4 bits' in Table 2. This indicates an antenna selected by performing an operation identical to that for the antenna grouping index.

The field including the $N_{ep}$ or the Downlink Interval Usage Code (DIUC) in table 2 indicates coding rates and modulation schemes for sets of encoders and modulators, which correspond to the number of layers, through a value of 4 bits. That is, when a plurality of layers exists, the field indicates a coding rate and a modulation scheme by a $N_{ep}$ scheme in a Hybrid Automatic Request (H-ARQ) supplementary information retransmission (that is, Incremental Redundancy) mode. Further, when at least one layer includes an error in a mobile station, a non acknowledgement (NACK) is generated and combination data for coding gain increases for data of all layers are retransmitted. Further, when the Channel Quality Information Channel (CQICH) is assigned, the last field indicates CQICH channel allocation information in order to load single CQI feedback information on each layer. Because each layer uses different encoding and modulation schemes as described above, each layer requires CQI feedback information.

Table 3 illustrates the fields that a mobile station must refer to in order to feedback the CQI in a structure having multiple antennas or multiple layers. The field 'CQICH-NUM' representing the number of feedback channels denotes the number of feedback channels to be simultaneously transmitted by the mobile station. The field 'CQI Feedback type', which indicates the type of feedback information to be transmitted from each feedback channel, enables the mobile station to transmit different feedback information according to each allocated feedback channel. This enables the mobile station to transmit various feedback information required by a base station, thereby leading to more efficient operation of the MIMO technology.

As described above, the transmitter, i.e., the base station, determines at least one matrix from among a plurality of transmission matrices by considering information fedback from the receiver, i.e., the mobile station, thereby performing STC encoding or precoding by means of the determined matrix and transmitting information for the determined matrix to the mobile station through a MIMO Compact DL-MAP message newly proposed by the present invention. Herein, the mobile station can understand the information for the matrix with reference to information for the layer values and the Mt values transmitted from the base station. Accordingly, the mobile station can perform decoding by using the transmission matrix corresponding to the information for the layer values and the Mt values while having already recognized the information as described in FIG. 3.

According to the present invention as described above, it is possible to efficiently notify a mobile station of various basic technologies for a MIMO and various MIMO precoding technologies using only a small quantity of data through downlink MAP message in a BWA system, thereby improving performance of the BWA system and increasing its cell capacity.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for supporting various Multiple Input Multiple Output (MIMO) technology in a Broadband Wireless Access (BWA) system, the method comprising the steps of:
communicating with a mobile station, by a base station, by using a downlink MAP message comprising a first field indicating a MIMO technology and a precoding technology, a second field indicating a number of layers determined by a number of sets of encoders and modulators, and a third field indicating a number of output streams of a space time coding encoder,
wherein the second field and the third field are used to indicate a transmission matrix used for encoding.

2. The method as claimed in claim 1, wherein the first field indicates whether an antenna grouping MIMO mode and an antenna selection MIMO mode are set up.

3. The method as claimed in claim 2, wherein the downlink MAP message comprises a plurality of antenna grouping indexes, each representing a matrix indicated according to the number of layers and the number of output streams, when the first field is set to a value indicating the antenna grouping MIMO mode.

4. The method as claimed in claim 2, wherein the downlink MAP message comprises a plurality of antenna selecting indexes each representing a matrix indicated according to the number of layers and the number of output streams, when the first field is set to a value indicating the antenna selecting MIMO mode.

5. The method as claimed in claim 1, wherein the downlink MAP message comprises a matrix indicator field indicating the transmission matrix.

6. The method as claimed in claim 1, wherein the downlink MAP message comprises a field indicating whether a MIMO mode is changed.

7. The method as claimed in claim 1, wherein the downlink MAP message comprises a field indicating the number of CQI channels allocated to the mobile station, a field indicating a type of a feedback information transmitted from the mobile station, and a field indicating allocation information of the CQI channel.

8. An apparatus for supporting various Multiple Input Multiple Output (MIMO) technology in a Broadband Wireless Access (BWA) communication system, the apparatus comprising:
a base station for communicating with a mobile station by using a downlink MAP message comprising a first field indicating a MIMO technology and a precoding technology, a second field indicating a number of layers determined by a number of sets of encoders and modulators, and a third field indicating a number of output streams of a space time coding encoder, and wherein the second field and the third field are used to indicate a transmission matrix used for encoding 9. The method-apparatus as claimed in claim 8, wherein the first field indicates whether an antenna grouping MIMO mode and an antenna selection MIMO mode are set up.

10. The apparatus as claimed in claim 9, wherein the downlink MAP message comprises a plurality of antenna grouping indexes, each representing a matrix indicated according to the number of layers and the number of output streams, when the first field is set to a value indicating the antenna grouping MIMO mode.

11. The apparatus as claimed in claim 9, wherein the downlink MAP message comprises a plurality of antenna selecting indexes, each representing a matrix indicated according to the number of layers and the number of output streams, when the first field is set to a value indicating the antenna selecting MIMO mode.

12. The apparatus as claimed in claim 8, wherein the downlink MAP message comprises a matrix indicator field indicating the transmission matrix.

13. The apparatus as claimed in claim 8, wherein the downlink MAP message comprises a field indicating whether a MIMO mode is changed.

14. The apparatus as claimed in claim 8, wherein the downlink MAP message comprises a field indicating the number of COI channels allocated to the mobile station, a field indicating a type of a feedback information transmitted from the mobile station, and a field indicating allocation information of the COI channel.

* * * * *

UNITED STATES PATENT AND TRADEMARK OFFICE
CERTIFICATE OF CORRECTION

PATENT NO. : 7,660,607 B2   Page 1 of 1
APPLICATION NO. : 11/268893
DATED : February 9, 2010
INVENTOR(S) : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 474 days.

Signed and Sealed this

Twenty-eighth Day of December, 2010

David J. Kappos
*Director of the United States Patent and Trademark Office*